J. CALLAN.
VEHICLE WHEEL.
APPLICATION FILED DEC. 28, 1911.

1,064,128.

Patented June 10, 1913.

Inventor
John Callan.

J. CALLAN.
VEHICLE WHEEL.
APPLICATION FILED DEC. 28, 1911.

1,064,128.

Patented June 10, 1913.
2 SHEETS—SHEET 2.

Witnesses
E. Larson
M. Schneider

Inventor
John Callan,
By
Attorney

UNITED STATES PATENT OFFICE.

JOHN CALLAN, OF RAY, ARIZONA.

VEHICLE-WHEEL.

1,064,128.

Specification of Letters Patent.　Patented June 10, 1913.

Application filed December 28, 1911. Serial No. 663,260.

*To all whom it may concern:*

Be it known that I, JOHN CALLAN, citizen of the United States, residing at Ray, in the county of Pinal and State of Arizona, have invented certain new and useful Improvements in Vehicle-Wheels, of which the following is a specification.

This invention relates to that class of vehicle wheels wherein the hub is provided with a pneumatic cushion, such a wheel being disclosed in my Patent No. 1,004,988, dated October 3, 1911; and it is the object of the present invention to improve the structure of said wheel, the same consisting in a novel construction and arrangement of parts to be hereinafter described and claimed.

In order that the invention may be better understood, reference is had to the accompanying drawings, in which—

Figure 1:
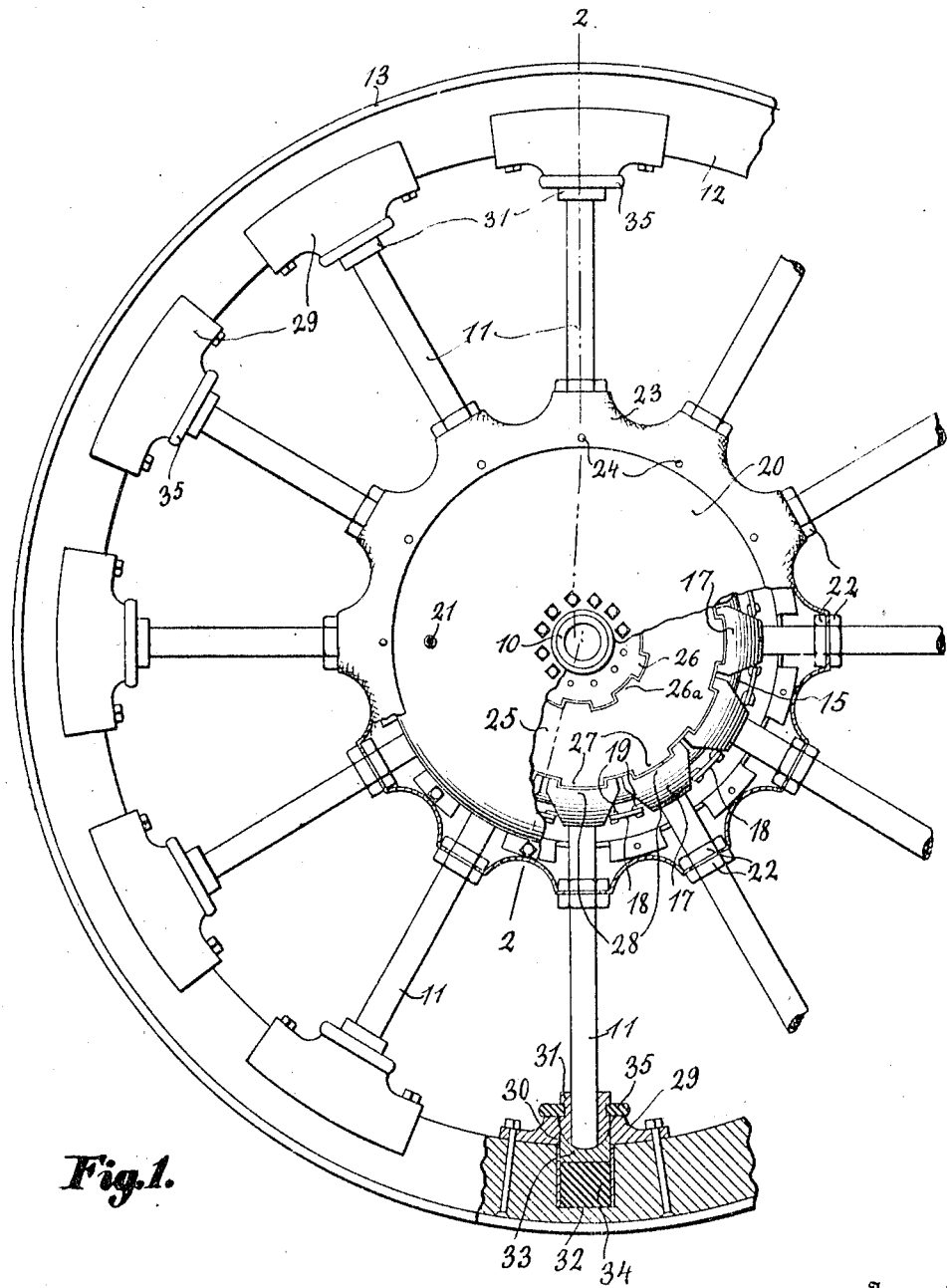
Figure 2:
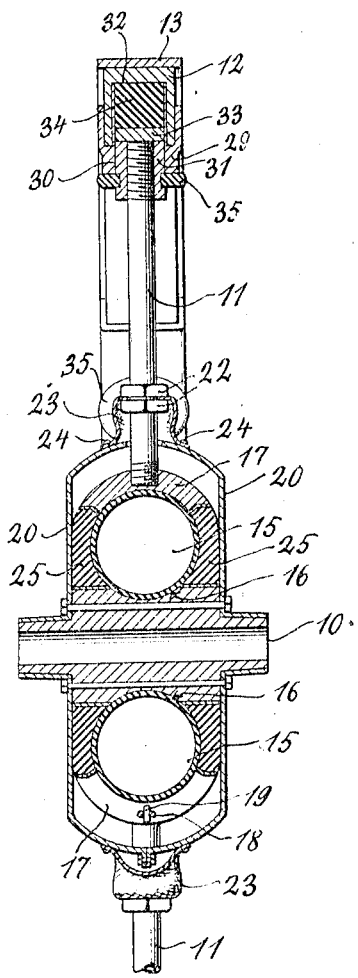
Figure 3:
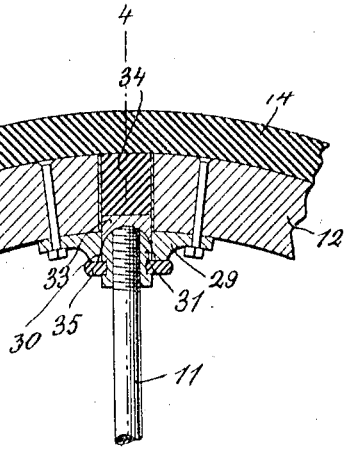
Figure 4:
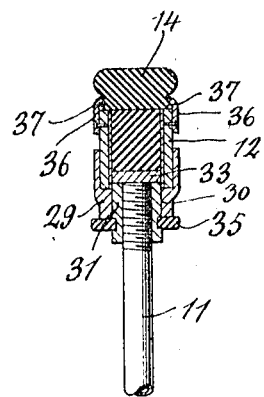

Figure 1 is an elevation of the wheel with parts broken away. Fig. 2 is a sectional view taken on the line 2—2 of Fig. 1. Fig. 3 is a sectional detail showing a modified form of connection between the rim and one of the spokes. Fig. 4 is a section on the line 4—4 of Fig. 3.

Referring specifically to the drawings, 10 denotes the hub of the wheel; 11 are the spokes, and 12 is the rim, which latter may be provided with a metal tire 13. Figs. 3 and 4 show the wheel equipped with a rubber tire 14. The hub 10 is encircled by a cushion, the same comprising an inflatable tube 15. The periphery of the hub has a groove 16 in which the tube seats. The inner ends of the spokes 11 carry shoes 17 which engage the tube 15. The side of the shoe which is in contact with the tube is grooved and also curved to conform to the contour of the tube and to fit snugly thereon. The shoes are connected by means of links 18 which engage hooks 19 on the ends of the shoes. The connection is a loose one and its purpose is to prevent displacement of the shoes, and by having a loose connection each shoe may yield inward with the tube independent of the other shoe.

The hub 10, tube 15 and shoes 17 are inclosed in a housing 20 having openings through which the spokes loosely extend. The tube has a suitable inflation valve, the stem 21 of which extends to the outside of the housing through an opening therein. On the outside of the housing, and close thereto, the spokes carry each a pair of nuts 22 between which latter is clamped a canvas or other flexible cover 23, which is also secured to the outside of the housing by buttons or studs 24, the purpose of said cover being to exclude dust, dirt, etc., from the interior of the housing.

Referring to Fig. 2 of the drawings, it will be seen that the width of the shoes 17 is greater than the diameter of the tube 15, so that said shoes project beyond both sides of the tube. Between the projecting portions of the shoes, and that portion of the periphery of the hub which is not occupied by the tube, on each side of the latter, is interposed a solid rubber ring 25 which rings serve as auxiliary cushion elements. The periphery of the hub has teeth 26 which interlock with teeth 26ª on the inner periphery of the rings, whereby the latter are locked to the hub so as to turn therewith. The outer periphery of each ring has teeth 27 which correspond in number to the number of shoes 17. The projecting side portions of the shoes have recesses 28 into which the teeth 27 extend, whereby the shoes are locked to the rings, each shoe being locked to both rings. Inasmuch as the rings are also locked to the hub, it will be seen that a driving connection between the hub and the shoes is had. The teeth of the rings have a metal facing to resist wear. The rings are shaped to fit the sides of the tube 15, and the latter is thus entirely inclosed on its sides. In case of puncture of the tube, the rings prevent it from collapsing.

To the inner periphery of the rim 12 are secured plates 29 having openings 30 forming spoke sockets in which loosely seat heads 31 secured to the outer end of the spokes 11. The opening 30 and the inner end of the head 31 are rounded off so that the spokes are free to rock slightly in the plane of the rotation of the wheel, to accommodate the spokes to the various movements incident to the travel of the wheel when the latter is in motion. The rim 12 has recesses 32 which are in line with the openings 30. In each recess seats a follower 33 which is shaped to fit over the rounded end of the head 31. The recess also contains a rubber block 34 against which the follower abuts. The recesses have a metal lining to resist wear.

It will be seen from the foregoing that the outer ends of the spokes also work against a cushion which receives all jars occasioned by uneven surfaces encountered in the road, thereby allowing the vehicle to travel smoothly at all times.

In order to exclude dust, dirt, etc., from the spoke sockets, the heads 31 carry gaskets 35 which fit over the outer end of the openings 30.

If a rubber tire 14 is employed, the recesses 32 will extend entirely through the rim, as shown in Figs. 3 and 4, so that the blocks 34 will be in contact with the inner periphery of the tire.

Fig. 4 shows the rubber tire 14 secured to the rim 12 by rings 36, the base of the tire having side flanges 37 and the rings being shaped to grip said flanges.

I claim:

A wheel comprising a hub, a cushion encircling the hub, a rim, spokes carried by the rim, shoes carried by the inner ends of the spokes, said shoes engaging the cushion and projecting from the sides thereof, said projecting side portions of the shoes having recesses in their inner ends, and auxiliary cushion rings on opposite sides of the aforesaid cushion between the hub and the projecting portions of the shoes, said hub and inner periphery of the rings having interlocking portions, and the outer periphery of the rings having teeth which seat in the aforesaid recesses of the shoes.

In testimony whereof I affix my signature in presence of two witnesses.

JOHN CALLAN.

Witnesses:
G. O. NOLAN,
CHRIS CHRISTENSEN.